US012534420B2

(12) United States Patent
Gonzalez Leon et al.

(10) Patent No.: US 12,534,420 B2
(45) Date of Patent: Jan. 27, 2026

(54) USE OF A RENEWABLE COMPOSITION FOR COATING PARTICLES

(71) Applicant: Arkema France, Colombes (FR)

(72) Inventors: Juan Antonio Gonzalez Leon, Lyons (FR); Dominique Imbert, Carrieres Sous Poissy (FR)

(73) Assignee: Arkema France, Puteaux (FR)

( * ) Notice: Subject to any disclaimer, the term of this patent is extended or adjusted under 35 U.S.C. 154(b) by 951 days.

(21) Appl. No.: 17/312,826

(22) PCT Filed: Dec. 9, 2019

(86) PCT No.: PCT/FR2019/052976
§ 371 (c)(1),
(2) Date: Jun. 10, 2021

(87) PCT Pub. No.: WO2020/120886
PCT Pub. Date: Jun. 18, 2020

(65) Prior Publication Data
US 2022/0127492 A1    Apr. 28, 2022

(30) Foreign Application Priority Data

Dec. 14, 2018 (FR) ..................... 1872941

(51) Int. Cl.
*C05G 5/30* (2020.01)
(52) U.S. Cl.
CPC ..................... *C05G 5/37* (2020.02)
(58) Field of Classification Search
CPC .......... C05D 167/04; C05G 5/37; C05G 5/30; C05G 5/38; C09D 7/63; A01N 25/04; A23K 40/10; A23K 40/30; A23K 20/158; A23K 40/03; B01J 13/04; C05B 7/00; C05B 19/00; C01P 2004/50
See application file for complete search history.

(56) References Cited

U.S. PATENT DOCUMENTS

| 6,355,083 B1 | 3/2002 | Ogzewalla |
| 8,163,059 B2 | 4/2012 | Tran et al. |
| 8,480,782 B2 | 7/2013 | Wright et al. |
| 8,846,126 B2 | 9/2014 | Baseeth et al. |
| 2006/0040049 A1 | 2/2006 | Spence |

FOREIGN PATENT DOCUMENTS

| CN | 107226752 A | 10/2017 |
| EP | 1627865 A1 | 2/2006 |
| EP | 1390322 81 | 5/2006 |
| JP | 2011016697 A * | 1/2011 |
| WO | 2006100341 A2 | 9/2006 |
| WO | 2007100251 A1 | 9/2007 |
| WO | 2011143566 A1 | 11/2011 |

OTHER PUBLICATIONS

Hlaváč, Peter, Monika Božiková, and Ana Petrović. "Selected physical properties assessment of sunflower and olive oils." Acta Technologica Agriculturae 22.3 (2019): 86-91. (Year: 2019).*
Patel, Vinay R., et al. "Castor oil: properties, uses, and optimization of processing parameters in commercial production." Lipid insights 9 (2016): LPI-S40233. (Year: 2016).*
Stanciu, Ioana. "Viscosity Indices of Rapeseed Oil." Journal of Chemistry and Chemical Engineering 6.7 (2012): 668. (Year: 2012).*
Choi, Geun Hyoung, et al. "Quantitative analyses of ricinoleic acid and ricinine in Ricinus communis extracts and its biopesticides." Journal of Applied Biological Chemistry 59.2 (2016): 165-169. (Year: 2016).*
Guenet. J., "Organogels: Thermodynamics, Structure, Solvent Role, and Properties", Springer Brief Materials, 2016, 129 pages.
International Search Report and Written Opinion for International Application PCT/FR2020/052976, dated April 7. 2020, 9 pages.
Rocha et al., "Thermal and Rheological Properties of Organogels Formed by Sugarcane or Candelilla Wax in Soybean Oil", Food Research International, 50, 2013, pp. 318-323.
Ullmann's Encyclopedia of Industrial Chemistry, 5th edition, VCH, New York, (1994), vol. A24, p. 224.
Office Action issued Oct. 29, 2024, by the Republic of Colombia Superintendency of Industry and Commerce in corresponding Colombian Patent Application No. NC2021/0009075 and an English machine translation of the Office Action. (22 pages).

* cited by examiner

*Primary Examiner* — Jennifer A Smith
(74) *Attorney, Agent, or Firm* — Buchanan Ingersoll & Rooney PC

(57) ABSTRACT

The present invention relates to the use of a gel formulation, wherein said gel formulation comprises at least: an oil of renewable origin, and a gel-forming agent which forms a gel at temperatures below 50° C. with the oil of renewable origin. The present invention also relates to a granular material coated with said gel formulation.

4 Claims, No Drawings

USE OF A RENEWABLE COMPOSITION FOR COATING PARTICLES

CROSS-REFERENCE TO RELATED APPLICATIONS

This is the national phase of International Application No. PCT/FR2019/052976, filed 9 Dec. 2019, which claims priority to French Application No. FR 1872941, filed 14 Dec. 2018. The disclosure of each of these applications is incorporated herein by reference in its entirety for all purposes.

FIELD OF THE INVENTION

The present invention relates to the field of coating compositions applied to granular materials such as granular fertilizers, in order to improve their quality and to obtain easier, longer and safer storage.

According to the invention, a granular material is a discrete solid particle which may be produced by many different chemical or mechanical processes in which one or more components are consolidated.

BACKGROUND OF THE INVENTION

Fertilizers are materials which provide one or more of the nutrients required for the correct development and growth of plants. These can be, for example, chemical or mineral fertilizers, manure or plant residues. Fertilizers are usually in the form of granular materials, as this facilitates their storage, transport and use in the fields. There are many known processes for preparing fertilizers in the form of a granular material, such as granulation, crystallization, crushing, grinding, prilling and compacting, among others.

However, fertilizers in granular form often have a tendency to agglomerate and can form aggregates or agglomerates which prevent the flow of the individual granules. This makes their transport and use much more difficult, or even impossible. In addition, fertilizers in granular form may also produce moderate to high amounts of dust when they are transported, unloaded or transferred. Atmospheres containing amounts of fine dust may be dangerous and very frequently cause serious health and safety problems.

The agglomeration and the generation of dust by fertilizers in granular form may generally be reduced and even avoided by methods which are already known, for example when the granules are coated. Such coatings are generally sprayed onto the fertilizer granules at the end of their production process. The coated fertilizers are then stored for a certain amount of time or transported to another site where they are stored or applied. These coatings are generally based on petroleum-based components, for example mineral oils and waxes which may contain other components, such as surfactants, to improve their performance.

Although the performance of such coatings is well known in the industry, since they are currently used to solve the problem of dust generation and of agglomeration, the true effect of these petroleum-based components on the soils where the fertilizers are applied has to be taken into account. Specifically, mineral oils and waxes originating from petrochemical sources may exhibit a certain toxicity if they are not correctly purified or processed. In addition, they are generally considered as being non-biodegradable, which means that they may accumulate in the soils over the years, which leads to negative impacts on crop growth.

The idea of replacing the mineral oils and waxes in fertilizer coatings has already been considered in the past in order to reduce the dust generated by the fertilizers and to reduce the effect of agglomeration during storage.

For example, the document U.S. Pat. No. 6,355,083 claims a process for reducing dust originating from fertilizer by means of a composition which comprises an oxidized vegetable oil. The invention proves to be more effective than a vegetable oil on its own, but requires the chemical modification of the vegetable oil by oxidation with air at high temperature.

Document EP1390322 describes an agricultural composition comprising a wax and an oil, these possibly being of animal, fish or vegetable origin, a resin and a polymer. It is claimed that it protects a nitrate-based fertilizer against agglomeration and the formation of dust. The coatings described in this document show that high amounts of mineral wax are necessary, as well as a resin and optionally a synthetic polymer, to obtain the desired fertilizer protection.

Application US20060040049 claims a coating composition comprising a metal salt of an aliphatic fatty acid combined with methyl and ethyl esters of fatty acids or a vegetable oil and which may be useful in the reduction of the agglomeration and of the formation of dust in fertilizers. It is mentioned that the alkyl esters are used as a diluent. In one example, however, calcium oxide is used to produce a salt in situ from methyl esters of tall oil fatty acids in order to increase the viscosity of the composition.

Document U.S. Pat. No. 8,163,059 claims the use of a byproduct of a biodiesel production process to reduce the amount of dust generated during fertilizer storage. The byproduct further comprises alkyl esters of fatty acids and salts thereof with inorganic components such as sodium or calcium.

Document U.S. Pat. No. 8,480,782 claims a fertilizer coating essentially composed of oleic acid and a partially or completely hydrogenated vegetable oil. In the examples, the coatings must be at a temperature greater than the usual temperature (>112° C.) in order to be able to spray the composition because of its relatively high melting point (71° C.).

In a large number of these examples, the oils of vegetable or animal origin are hardly ever used as is but, in the majority of cases, are chemically modified in order to be useful as fertilizer coating. In certain other cases, there is no chemical modification, but large amounts of another component, such as waxes, specific salts, resins or polymers, are necessary to achieve the desired effect.

SUMMARY OF THE INVENTION

The actual technical problem to be solved is that the oils of renewable origin do not all confer satisfactory to good or even to very good coating formation upon the fertilizers. Most vegetable oils have a relatively low viscosity to exhibit good performance on their own and risk being absorbed into the porous fertilizer granule. As described in the prior art, they must generally have undergone a chemical reaction (crosslinking, polymerization), be mixed with high-viscosity products or formulated with large amounts of wax or the like in order to solidify the formulation at ambient temperature.

Consequently, it is of practical interest to find alternative methods for avoiding the drawbacks of the known techniques mentioned above while at the same time producing coatings of oil of renewable origin for granular materials in order to effectively reduce the tendency thereof towards agglomeration and towards dust formation.

Another objective of the present invention proposes the use of components which enable, at relatively low doses, easy preparation of formulations with various oils of renewable origin which may be used as coatings for granular materials.

According to yet another objective, the formulations of the present invention are used and are effective under the same storage and application conditions as the currently known fertilizer coatings.

DETAILED DESCRIPTION OF THE INVENTION

The present invention is not limited to the coating of fertilizers, but is also suitable for another medium requiring coating, such as minerals, cereals, flours, medicaments, ceramics, mineral aggregates from quarries and any other particulate product which has a tendency to agglomerate and/or to generate dust.

It has now been discovered that these objectives are completely or at least partially achieved with a specific formulation based on oils of renewable origin, said formulation being in the form of a gel. A gel (also referred to as "organogel") denotes an entity in which a liquid, in this case the oil of renewable origin, is trapped with a thermoreversible, three-dimensional network, said three-dimensional network being formed of one or more organic compounds. The self-assembled gel network is generally formed by one component at a relatively low concentration. Such gel formulations are described, for example, in Ullmann's Encyclopedia of Industrial Chemistry, 5th edition, VCH, New York, (1994) vol. A24, page 224.

All of the objectives mentioned above, as well as others, will become apparent in the following description of the present invention.

Consequently, a first subject of the present invention is the use of a formulation of gels, for example of thermoreversible gels or organogels, based on oils of renewable origin, in compositions for coating granular materials such as fertilizers, said use being specifically intended to prevent agglomeration and the generation of dust.

More specifically, the first subject of this invention is the use of a gel formulation comprising an oil of renewable origin and a gel-forming agent for coating a granular material.

A "gel-forming agent", in the context of the present invention, is any compound or mixture of compounds, well known to the person skilled in the art and which can form a gel at temperatures of less than 50° C. with the oil of renewable origin.

More specifically, the present invention relates to the use of a gel formulation comprising an oil of renewable origin and a gel-forming agent for coating a granular material, said gel formulation comprising at least:
an oil of renewable origin, and
a gel-forming agent which forms a gel at temperatures of less than 50° C. with the oil of renewable origin.

In the context of the invention, an "oil of renewable origin" denotes an oil of renewable origin, as opposed to a fossil origin, and preferably from vegetable or animal sources. The oil of renewable origin may originate from a direct extraction, from an intermediate step of such an extraction process, and also from a secondary product, such as a distillate, or a byproduct in the process of obtaining the oil from a given source, and the like. It may also be a mixture of several such oils. Oil and mixtures of oils are denoted simply by "oil" in the present description.

Preferably, the oil of renewable origin for use in the present invention is an oil originating from vegetable sources. More preferably, the oil of renewable origin is liquid at temperatures of greater than 40° C. Even more preferably, the viscosity of the oil of renewable origin at 40° C. is between 2 mPa·s and 1500 mPa·s, limits included, as measured by means of a dynamic shear rheometer with parallel plate geometry at a shear rate of 80 s$^{-1}$. Even more preferably, the oil of renewable origin has an iodine number of between 70 and 150 as measured by titration methods, as described in the standard ASTM D5768-02.

The oil of renewable origin may be used as is or in a modified form, for example in its partially or completely hydrogenated form. Mixtures of oils of renewable origin may also be used in the present invention.

Preferred examples of oils of renewable origin include almond oil, avocado oil, cottonseed oil, cashew nut oil, grapeseed oil, hazelnut oil, rice bran oil, linseed oil, peanut oil, colza oil, sesame oil, sunflower oil, coconut oil, palm oil, palm kernel oil, corn oil, canola oil, soybean oil, olive oil and an oil derived from a papermaking process, such as tall oil. The oils mentioned may be in crude form, for example may originate from mechanical or solvent extraction steps, from an intermediate refining or separation step, from a chemical modification step or from a final refining process.

The gel-forming agent of the present invention may be any compound, molecule or polymer or prepolymer which is capable of forming a gel with an oil of renewable origin as defined above at ambient pressure and at ambient temperature. Mixtures of two or more than two of these gel-forming agents may also be used in any proportions.

The formation of the gel is known in the art, for example in Ullmann's Encyclopedia of Industrial Chemistry, 5th edition, VCH, New York, (1994) vol. A24, page 224, as previously indicated in the present document, and may for example result from the joint mixing of the oil of renewable origin and of the gel-forming agent, which may have been melted beforehand, if necessary, until a homogeneous mixture is obtained, said homogeneous mixture forming a gel after cooling to ambient pressure and temperature (gel assembly).

The formation and characteristics of hydrophobic gels are described in general in J. M. Guenet, "Organogels", Springer Brief Materials, (2016). Consequently, a "gel" in the context of the present invention is a system comprising at least two components, generally a solid dispersed in colloidal fashion in a liquid dispersing agent. The dispersed particles form spatial networks in the dispersing agent which are stabilized by means of van der Waals forces, so that the dispersing agent acts as a solvation shell. In the present invention, the gel-forming agent is the solid which is dispersed in colloidal fashion and the oil of renewable origin is the dispersing agent.

Preferably, the gel-forming agent is present in a weight ratio of from 0.01 to 0.18, limits included, relative to the oil of renewable origin, more preferably in a weight ratio of from 0.02 to 0.12, limits included, relative to the oil of renewable origin, and even more preferably in a weight ratio of from 0.03 to 0.07, limits included, relative to the oil of renewable origin.

In one embodiment of the present invention, the gel-forming agent comprises colloidal sweetening agents selected from those known to the person skilled in the art and, for example, which may be selected from mineral sources such as silica fume or clays, such as bentonites.

According to a preferred embodiment of the present invention, the gel-forming agent comprises a compound or a prepolymer or a polymer comprising at least one hydroxyl function (—OH) and at least one carboxylic acid function (—COOH) or one carboxylic acid ester function (—COOR). According to another preferred embodiment, the gel-forming agent comprises at least one —OH function and at least one —COOH function, and even more preferably the gel-forming agent comprises one —OH function and one —COOH function.

Thus, and according to a preferred embodiment of the present invention, the gel-forming agent comprises at least one compound of formula (1):

in which
- $R^1$ represents a linear or branched, saturated or unsaturated, $C_1$-$C_{10}$, preferably $C_1$-$C_6$, hydrocarbon chain optionally containing at least one aromatic ring, preferably $R^1$ is a saturated $C_1$-$C_6$ hydrocarbon chain,
- $R^2$ represents a linear or branched, saturated or unsaturated, $C_4$-$C_{34}$, preferably $C_5$-$C_{30}$, more preferably $C_6$-$C_{20}$, hydrocarbon chain optionally containing at least one aromatic ring, preferably $R^2$ is a saturated $C_6$-$C_{12}$ hydrocarbon chain,
- n is an integer between 1 and 20, preferably between 1 and 10, limits included, more preferably between 1 and 6, even more preferably n represents 1, 2, 3, 4 or 5, advantageously n is 1, 2 or 3,
- A is selected from a hydrogen atom, and a hydrocarbon radical, comprising n ($R^1$—CH(OH)—$R^2$—COO)— radicals, said hydrocarbon radical being a linear or branched, saturated or unsaturated, preferably $C_1$-$C_{40}$, more preferably $C_1$-$C_{30}$, hydrocarbon chain optionally containing at least one aromatic ring, optionally containing at least one ether or ester group, with the proviso that A can represent hydrogen only when n is equal to 1.

According to a preferred embodiment, the compound of formula (1) is the product of reaction of n moles of acid of the formula ($R^1$—CH(OH)—$R^2$—COO)—H with an alcohol of the formula A-(OH)$_n$, where $R^1$, $R^2$ and n are as defined above, according to reaction conditions well-known to the person skilled in the art.

Examples of alcohols of the formula A-(OH)$_n$ include, in nonlimiting fashion, alkanols, polyols, sugars, and more specifically $C_1$-$C_{24}$, preferably $C_1$-$C_{12}$, more preferably $C_1$-$C_6$, mono- or polyalcohols, for example glycerol (or 1,2,3-propanetriol). Nonlimiting examples of such alcohols include ethylene glycol, glycerol, erythritol, xylitol, threitol, mannitol, sorbitol, galactitol, fucitol, iditol, inositol, volemitol, isomalt, maltitol, lactitol, maltotriitol, maltotetraitol, dextrin, dextrose, disaccharides, fructose, sucrose, galactose, lactose, maltose, maltodextrin, mannose, xylose, and also sugars of natural origin, for example cane sugar, caramel, caster sugar, glucose syrup and molasses, and the like, and also mixtures of these.

According to a particularly preferred embodiment, the gel-forming agent comprises a compound of formula (1) selected from hydroxystearic acid, ricinoleic acid, partially hydrogenated castor oil and fully hydrogenated castor oil, and mixtures of these. Other examples of such compounds of formula (1) useful as gel-forming agents can be found in the article by Barbosa Rocha, J. C., "Food Research International", 50, (2013), 318-323, such as for example triacylglycerols, diacylglycerols, monoacylglycerols, fatty acids, fatty alcohols, waxy esters, sterol esters, sorbitan monostearate, lecithin, phytosterols, natural waxes such as beeswax, candelilla wax, sugarcane wax and carnauba wax, and the like, and also mixtures of these.

The gel formulation of the present invention may additionally comprise one or more other components, such as for example one or more other additives, fillers and others, and which are commonly used in the art, such components possibly and advantageously being selected from:

- antiagglomerating agents, and preferably antiagglomerating surfactants such as alkylamines, fatty acids, alkyl phosphoric esters, alkyl ether phosphoric esters, linear alkyl alcohols, alkoxylated alkyl sulfates, alkyl ether sulfates, and combinations thereof, preferably salts of alkylamines with alkyl phosphoric esters,
- rheology modifiers such as biodegradable or non-biodegradable polymers, waxes, preferably waxes from renewable sources, or from mineral sources, or synthetic waxes, such as Fischer-Tropsch waxes, resins, such as rosin acids, or modified rosin acids, tall oil pitch, pine tar pitch, pine rosins, tall oil rosins, amidoamides, alkylamidoamides,
- hydrophobicizing agents such as linear alkyl alcohols or macrocrystalline waxes,
- dispersing agents such as oils of mineral origin,
- dyes, UV tracers, pigments,
- mineral and/or organic micronutrients and trace elements which may be, but preferably are, finely dispersed and/or compatibilized, for example metal complexes,
- biostimulants, such as mineral or organic materials and substances which are added to improve or maintain the biological functions of soils, animals and plants,
- pesticides, such as insecticides, herbicides, fungicides, nematicides and others,
- bacteria, yeasts, fungi, viruses,
- antioxidants, for example tert-butylhydroquinone (also known as TBHQ), preservatives, UV stabilizers,
- odor masking agents, anti-odorant agents, aromas, fragrances,
- and also mixtures of two or more of the components listed above.

Preferably, the gel-forming agent is a solid at ambient temperature, and more preferably the gel-forming agent has a melting point of between 40° C. and 95° C., limits included.

Preferably, the gel-forming agent which forms a gel with the oil of renewable origin is used at doses of between 1% by weight and 15% by weight, more preferably between 1% by weight and 10% by weight, even more preferably between 2% by weight and 10% by weight, and even more preferably between 2% by weight and 6% by weight, advantageously between 3% by weight and 6% by weight, limits included, relative to the oil of renewable origin.

The gel formulation for use in the present invention may comprise one or more oils of renewable origin and one or more gel-forming agents, as described above.

Preferred gel formulations of the present invention comprise at least one antioxidant.

Preferably, the gel is a thermoreversible gel, which means that it can be melted by heating and reformed after cooling as desired. This process of melting and reforming is perfectly reversible since the formation and the melting of the gel occurs via first-order transitions. Preferably, the thermoreversible gel formed melts at temperatures of greater than 40° C., even more preferably of greater than 50° C. The gel formed may itself be soluble in other dispersing liquids, such as the same oils of renewable origin or other oils of renewable origin.

Preferably, the gel in the present invention is a substance which has a complex storage modulus G' value which is higher than its complex viscous dissipation modulus G", as measured in a dynamic shear rheometer, between two parallel plates at a frequency of 1 Hz and a strain amplitude of 0.1%, at a temperature of less than 40° C.

The gel formulation obtained can be used in several different fields of application and exhibits particularly effective use as a coating for granules of fertilizer, or other mineral products, in order to reduce and even avoid the dust generated during transport. The gel formulation of the present invention may also be very useful for its antiagglomerant properties, in particular when it is used as a coating for granules of fertilizer, or other mineral products.

Consequently, and as indicated above, the present invention relates to the use of the gel formulation described above for coating a granular material, where the granular material may be any granular material known in the art, such as those selected from, as nonlimiting examples, fertilizers, coal, mineral ores, mineral aggregates, sulfur, wood chips, sludge, granulated wastes, medicaments, cereals, granulated animal feeds, and the like, and more preferably the granular material is a fertilizer.

In the context of the invention, "fertilizer" is a particle of inorganic and/or organic material which provides the soil and/or the crops with mineral and/or organic nutrients or other substances which enhance their growth. The fertilizer particles may originate from any known process for producing fertilizers, such as granulation, grinding, mixing or formulating, compacting or prilling.

Preferably, the fertilizer particles comprise nitrates, such as ammonium nitrates, nitrophosphates, ammonium phosphate sulfate, ammonium sulfate, calcium ammonium nitrates, calcium nitrate, diammonium phosphate, potassium chloride, monoammonium phosphate, muriate of potash, sulfate of potash, sulfate of potash magnesia, single superphosphate, triple superphosphate, urea, sulfur, polyhalite and other complex or composite fertilizers containing several elements, and for example those known under the acronym NPK.

The composition of the present invention may be applied using any coating process known to the person skilled in the art or according to similar common processes used for coating particles, such as those used for granulated fertilizers, such as for example according to known spray coating techniques. This may be performed using a batch or continuous process. For example, the granulated fertilizer may be introduced into a rotary coating drum while the coating is applied via one or more pressurized nozzles. The coating may also be sprayed while the granulated fertilizer rotates on an inclined granulation drum or is within a fluidized bed chamber.

The step of coating with the gel formulation of the present invention may be performed before, and/or simultaneously with, and/or after, operation(s) of coating of another material, such as for example coating of additional nutrients or biological functions which are useful for the soils or the animals or the plants, coating of antiagglomerating agents such as for example clays (for example a kaolin), talc, and the like.

Once applied to the surface of a granular material, the amount of gel formulation coated onto the granular material may vary within high proportions and, advantageously and preferably, within amounts between 0.01% by weight and 10% by weight, more preferably between 0.02% by weight and 2% by weight, limits included, relative to the total mass of the coated granular material.

The present invention further relates to the granular material coated with the gel formulation of the present invention. Once applied to the surface of a granular material (for example, and preferably, a fertilizer granule), it has been shown that the gel formulation of the present invention is effective for achieving one or more of the following objectives:
  reducing or avoiding the release of dust from the coated particles,
  reducing or avoiding the agglomeration of the coated particles,
  reducing or avoiding the absorption of moisture into the coated particles,
  binding other mineral or organic particles to the coated particle.

According to a preferred embodiment, the present invention relates to a fertilizer granule coated with a gel formulation of the present invention. In a preferred embodiment, the amount of gel formulation coated onto the fertilizer granule is between 0.01% by weight and 10% by weight, more preferably between 0.02% by weight and 2% by weight, advantageously between 0.1% by weight and 1% by weight, limits included, relative to the total mass of the coated fertilizer granule.

The gel formulation of the present invention makes it possible to obtain coated particles, preferably of fertilizer, having one or more of the advantages below, among which it is possible to mention:
  no chemical reaction occurs between the gel and the coated particle,
  the change in viscosity (gel) is reversible according to the temperature,
  the gel coating is not a polymer (European legislation is in the process of changing in order to reduce/eliminate the use of polymers in fertilizers),
  the gel-forming agent is used at very low concentrations (the oil of renewable origin is then the major and more economical component of the gel formulation),
  compatibility with several types of oils of renewable origin, such as refined or crude oils or distillation residues,
  the coating process is the same as the current processes known in the art for coating particles (same spraying/coating equipment, same spraying temperatures).

The gel formulation of the present invention may be used in various other fields of application and is particularly suitable for the coating of particles which have a tendency to generate dust and/or to agglomerate, such as cereals, flours, medicaments, ceramics, mineral aggregates from quarries, and the like.

It is compatible with other commonly used fertilizer coating components such as surfactants, alcohols, waxes, etc.

The invention is further illustrated below by the following examples, which are presented as embodiments of the invention only, without bringing about any limitation of the scope of protection as defined by the appended claims.

EXAMPLES

Example 1

Composition A according to the invention is prepared by mixing 48.5 g of degummed soybean oil from Cefetra. Degumming is a well-known refining process in which the impurities in soybean oil, in particular the phosphatides or gums, are removed from the crude vegetable oil. The degummed oil is heated beforehand to 90° C. with 1.5 g of 12-hydroxystearic acid (from Mosselman) with stirring. Once the second component is completely melted and incorporated, the composition is cooled to ambient temperature. Once cooled, composition A is clear and forms a gel.

Another composition, composition B, according to the invention, is prepared by mixing 47.5 g of olive oil heated beforehand to 90° C. and 2.5 g of hydrogenated castor oil (from Mosselman) with stirring. Once the second component is completely melted and incorporated, the composition is cooled to ambient temperature. Once cooled, composition B also forms a gel.

A third composition, composition C, as a comparative example and not forming part of this invention, is prepared by mixing 47.5 g of soybean oil (degummed, as described above), heated beforehand to 90° C., with 2.5 g of a microcrystalline mineral wax (congealing point>65° C., from Lotos Company) with stirring.

Once the second component is completely melted and incorporated, the composition is cooled to ambient temperature. Once cooled, composition C is cloudy and remains a viscous liquid. The complex moduli of the prepared compositions are measured by means of an Anton Paar MCR301 dynamic shear rheometer using a 50 mm parallel plate geometry at 40° C. at 1 Hz and a strain amplitude of 0.1%. The results obtained for the moduli of elasticity (G') and loss (G") are presented in table 1 below.

TABLE 1

|  | G' (Pa) | G" (Pa) |
|---|---|---|
| Composition A (invention) | 2951 | 828 |
| Composition B (invention) | 18739 | 4842 |
| Composition C (comparative) | 0.69 | 0.89 |

Complex Moduli of Compositions at 40° C.

As can be observed, not only are the values of composition A and composition B greater by several orders of magnitude than those of comparative composition C, but also, in both cases (composition A and composition B), the storage modulus G' is greater by at least an order of magnitude than the loss modulus G.

In contrast, a mineral wax (composition C), even at 5% by weight, which is the minimal dose generally used in fertilizer compositions, does not lead to a similar change in rheology. In addition, the modulus G" is greater than G', which indicates that the composition flows, that is to say that it is not in the form of a gel, and hence is not usable in the present invention.

Example 2

The following tests are conducted in order to evaluate the amount of dust released by a coated NPK sample during transport. The tests are conducted using a Microtrack optical dust measuring instrument. A sample of 300 g of coated fertilizer is introduced into the instrument and the dust generated by the deposition (due to impact after the drop) is recorded by optical methods for 60 seconds. The amount of dust generated is proportional to the integral of the measured optical signal (arbitrary units) as a function of the measurement time.

The value of the integral allows a comparison to be made between coatings, the best coating being the one having the lowest value. 500 g of NPK 20-16-3 granules are heated at 40° C. for 4 hours before being mixed in an open-end laboratory coating drum and sprayed with 1 g of coating formulation sample, at 90° C. The coated granules are kept in a closed container at 40° C. for 7 days before being subjected to testing for the formation of dust.

Composition A of example 1 (according to the invention) is used as coating on the NPK granules and is subjected to a dust test. Similarly, soybean oil (degummed, as described above), a mineral oil (sold under the name OS100 by Osilub) and a composition D, prepared in a similar manner to that described in example 1, containing 15% mineral wax (congealing point>65° C., from Lotos Company) and soybean oil (degummed, as described above), are also subjected to testing for the formation of dust as comparative example. Table 2 shows the integral values of the dust test for each coating (integral of the optical signal values).

TABLE 2

| Composition | Dust generated |
|---|---|
| Composition A (invention) | 2.04 |
| Soybean oil (comparative) | 7.74 |
| Mineral oil (comparative) | 9.24 |
| Composition D (comparative) | 3 |
| Untreated | 110 |

Dust Generated by Coated Fertilizers

Although all of the solutions evaluated produce some degree of protection against dust, composition A according to the present invention exhibits the best dust protection values (lowest level of dust generated after simulated storage). The value is significantly better than the same soybean oil on its own, a mineral oil and even a formulation which contains a much higher amount of mineral wax (composition D).

The invention claimed is:

1. A method for coating a granular material comprising contacting a granular material with a gel formulation, the gel formulation comprising:
   an oil of renewable origin selected from soybean oil, olive oil, a tall oil, colza oil, and a methyl ester of colza oil; and
   a gel-forming agent comprising one or more of hydroxystearic acid, partially hydrogenated castor oil and fully hydrogenated castor oil, the gel-forming agent being present in a weight ratio of 0.02 to 0.12, limits included, relative to the oil of renewable origin,
   wherein storage modulus G' of the gel formulation is greater than loss modulus G" of the gel formulation as measured by an Anton Paar MCR301 dynamic shear rheometer using a 50 mm parallel plate geometry at 40° C. at 1 Hz and a strain amplitude of 0.1%, and
   wherein the granular material is a fertilizer.

2. The method as claimed in claim 1, wherein the granular material is selected from nitrates, nitrophosphates, ammonium phosphate sulfate, ammonium sulfate, calcium ammonium nitrates, calcium nitrate, diammonium phosphate, potassium chloride, monoammonium phosphate, muriate of potash, sulfate of potash, sulfate of potash magnesia, single superphosphate, triple superphosphate, urea, sulfur, polyhalite, and NPK fertilizers.

3. A granular material coated with a gel formulation comprising:

an oil of renewable origin selected from soybean oil, olive oil, tall oil, colza oil, methyl ester of colza oil and mixed acid oils; and a gel-forming agent comprising one or more of hydroxystearic acid, partially hydrogenated castor oil and fully hydrogenated castor oil, the gel-forming agent being present in a weight ratio of 0.02 to 0.12, limits included, relative to the oil of renewable origin, wherein storage modulus G' of the gel formulation is greater than loss modulus G" of the gel formulation as measured by an Anton Paar MCR301 dynamic shear rheometer using a 50 mm parallel plate geometry at 40° C. at 1 Hz and a strain amplitude of 0.1%, and wherein the granular material is a fertilizer.

4. The granular material as claimed in claim 3, wherein the gel formulation is coated onto the granular material in an amount of between 0.01% by weight and 10% by weight, limits included, relative to the total mass of the coated granular material.

\* \* \* \* \*